US009104629B2

(12) United States Patent
Haustein et al.

(10) Patent No.: US 9,104,629 B2
(45) Date of Patent: Aug. 11, 2015

(54) AUTONOMIC RECLAMATION PROCESSING ON SEQUENTIAL STORAGE MEDIA

(75) Inventors: Nils Haustein, Mainz (DE); Stefan Neff, Mainz (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 943 days.

(21) Appl. No.: 12/769,751

(22) Filed: Apr. 29, 2010

(65) Prior Publication Data

US 2011/0010495 A1    Jan. 13, 2011

(30) Foreign Application Priority Data

Jul. 9, 2009   (EP) .................................... 09165001

(51) Int. Cl.
*G06F 12/14* (2006.01)
*G06F 11/14* (2006.01)
*G06F 3/06* (2006.01)

(52) U.S. Cl.
CPC ............ *G06F 11/1469* (2013.01); *G06F 3/064* (2013.01); *G06F 3/0608* (2013.01); *G06F 3/0682* (2013.01); *G06F 3/0686* (2013.01); *G06F 11/1456* (2013.01)

(58) Field of Classification Search
None
See application file for complete search history.

(56) References Cited

U.S. PATENT DOCUMENTS

| | | | |
|---|---|---|---|
| 4,755,928 A | 7/1988 | Johnson et al. | |
| 5,574,881 A | 11/1996 | Yasuoka et al. | |
| 6,070,224 A | 5/2000 | LeCrone et al. | |
| 6,148,382 A * | 11/2000 | Bitner et al. | 711/162 |
| 6,289,425 B1 | 9/2001 | Blendermann et al. | |
| 6,789,161 B1 | 9/2004 | Blendermann et al. | |
| 7,085,908 B2 | 8/2006 | Wong et al. | |
| 7,603,530 B1 * | 10/2009 | Liikanen et al. | 711/162 |
| 7,606,845 B2 | 10/2009 | Cannon et al. | |
| 7,765,369 B1 | 7/2010 | Prahlad et al. | |
| 8,510,524 B1 * | 8/2013 | Corbett et al. | 711/162 |
| 8,930,617 B2 | 1/2015 | Haustein et al. | |
| 8,935,469 B2 | 1/2015 | Haustein et al. | |
| 2002/0156968 A1 * | 10/2002 | Haustein | 711/111 |
| 2003/0014605 A1 | 1/2003 | Slater et al. | |
| 2003/0196036 A1 | 10/2003 | Gibble et al. | |
| 2005/0207235 A1 | 9/2005 | Blendermann et al. | |
| 2005/0216788 A1 | 9/2005 | Mani-Meitav et al. | |
| 2006/0294336 A1 * | 12/2006 | Gibble et al. | 711/171 |

(Continued)

FOREIGN PATENT DOCUMENTS

WO    2008039527 A2    4/2008

OTHER PUBLICATIONS

Brooks et al., "IBM Tivoli Storage Management Concepts," May 2006, retrieved from http://www.redbooks.ibm.com/redbooks/pdfs/sg244877.pdf on Dec. 18, 2013 (556 pages).

(Continued)

*Primary Examiner* — Charles Rones
*Assistant Examiner* — Ryan Dare
(74) *Attorney, Agent, or Firm* — Griffiths & Seaton PLLC

(57) ABSTRACT

Various embodiments for autonomic reclamation of data stored on at least one sequential storage media are provided. In one exemplary embodiment, active data stored on the at least one sequential storage media is identified. The active data is read out from a reclamation memory. The active data is stored in a sequential order by starting at a beginning block address of the at least one sequential storage media.

18 Claims, 10 Drawing Sheets

(56) References Cited

U.S. PATENT DOCUMENTS

| | | | |
|---|---|---|---|
| 2007/0233752 A1* | 10/2007 | Bangalore et al. | 707/202 |
| 2008/0243860 A1 | 10/2008 | Cannon et al. | |
| 2008/0263272 A1 | 10/2008 | Blendermann et al. | |
| 2009/0019217 A1* | 1/2009 | Gorobets et al. | 711/103 |
| 2009/0222634 A1* | 9/2009 | Pizlo et al. | 711/165 |
| 2009/0248974 A1* | 10/2009 | Bello et al. | 711/111 |
| 2011/0122522 A1 | 5/2011 | Itagaki et al. | |
| 2011/0320679 A1 | 12/2011 | Ashton et al. | |
| 2012/0239691 A1 | 9/2012 | Jaquette | |

OTHER PUBLICATIONS

"Tivoli Storage Manager for AIX Version 6.1 Administrator's Guide," copyright 2009, retrieved from http://publib.boulder.ibm.com/infocenter/tsminfo/v6/topic/com.ibm.itsm.srv.doc/b_srv_admin_guide_aix.pdf on May 22, 2014 (946 pages).

* cited by examiner

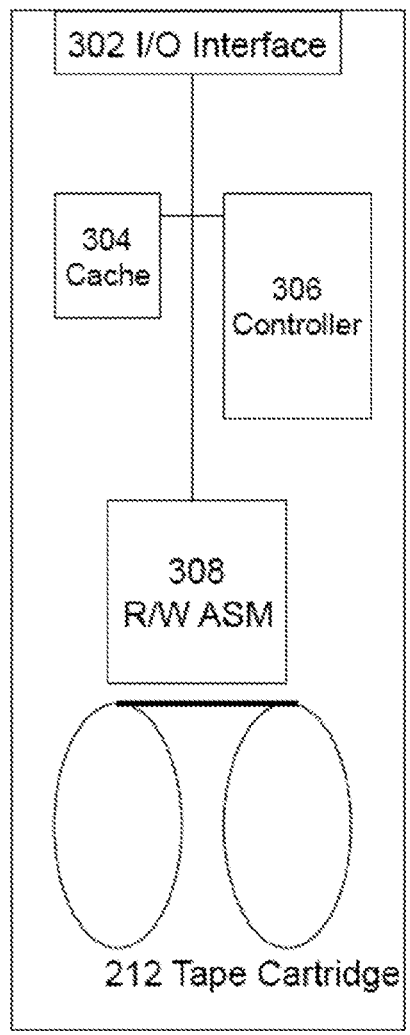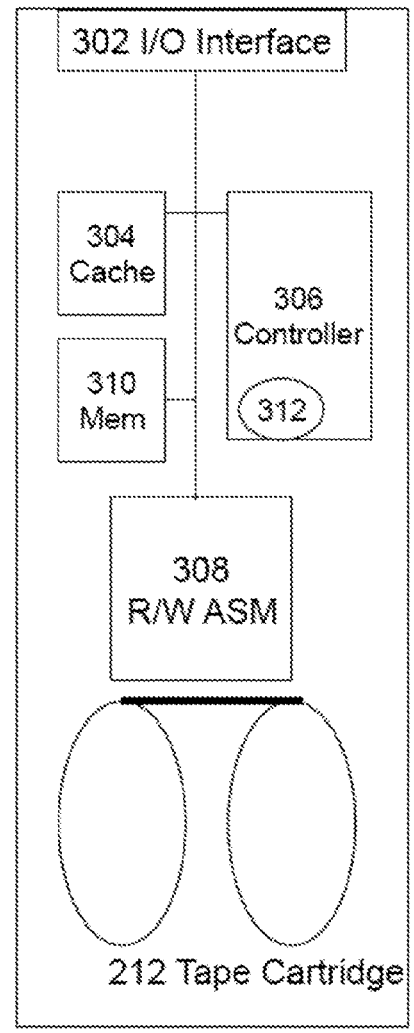
Figure 3a (Prior art) Figure 3b (Inventional)

Mode Select (15h)
Command

| Byte | Bit | | | | | | | |
|---|---|---|---|---|---|---|---|---|
| | 7 | 6 | 5 | 4 | 3 | 2 | 1 | 0 |
| 0 | Command Code ——502 | | | | | | | |
| 1 | Reserved = 0 | | | PF=1 | Reserved = 0 | | | SP |
| 2 | Reserved = 0 | | | | | | | |
| 3 | | | | | | | | |
| 4 | Parameter List Length ——504 | | | | | | | |
| 5 | VU = 0 | | Reserved = 0 | | | | Flag | Link |

Mode Page 25h: Block List active data page

| Byte | Bit | | | | | | | |
|---|---|---|---|---|---|---|---|---|
| | 7 | 6 | 5 | 4 | 3 | 2 | 1 | 0 |
| 0 | PS=1 | RSVD | Page Code = 25h | | | | | |
| 1 | Page Length = (2*N+2)h | | | | | | | |
| 3 | (MSB) Block Address 1 | | | | | | | |
| 4 | (LSB) | | | | | | | |
| 5 | (MSB) Block Address 2 | | | | | | | |
| 6 | (LSB) | | | | | | | |
| 7 | | | | | | | | |
| 8 | | | | | | | | |
| 9 | | | | | | | | |
| 10 | | | | | | | | |
| 2*N | (MSB) Block Address N | | | | | | | |
| 2*N+2 | (LSB) | | | | | | | |

— 602
— 604
— 606
— 608
— 610

Mode Sense (1Ah) Command

| Byte | Bit |  |  |  |  |  |  |  |
|---|---|---|---|---|---|---|---|---|
|  | 7 | 6 | 5 | 4 | 3 | 2 | 1 | 0 |
| 0 | Command Code |  |  |  |  |  |  |  |
| 1 | Reserved |  |  | RSVD | DBD | Reserved = 0 |  |  |
| 2 | PCF |  |  | Page Code |  |  |  |  |
| 3 | Subpage Code |  |  |  |  |  |  |  |
| 4 | Allocation Length |  |  |  |  |  |  |  |
| 5 | VU = 0 |  |  | Reserved = 0 |  |  | Flag | Link |

700 — (figure)
702 — Command Code
704 — Page Code
706 — Allocation Length

FIGURE 7

Mode Page 26h: Mapping Original to new blocks

| Byte | Bit | | | | | | | |
|---|---|---|---|---|---|---|---|---|
| | 7 | 6 | 5 | 4 | 3 | 2 | 1 | 0 |
| 0 | PS=1 | RSVD | Page Code = 26h — 802 / 804 | | | | | |
| 1 | Page Length = (4*N+2)h | | | | | | | |
| 3 | (MSB) Original Block Address 1 — 806 | | | | | | | |
| 4 | (LSB) — 808 | | | | | | | |
| 5 | (MSB)   New Block Address 1 | | | | | | | |
| 6 | (LSB) | | | | | | | |
| 7 | | | | | | | | |
| 8 | | | | | | | | |
| 4*N-1 | (MSB)  Original Block Address N — 810 | | | | | | | |
| 4*N | (LSB) — 812 | | | | | | | |
| 4*N+1 | (MSB)New Block Address N | | | | | | | |
| 4*N+2 | (LSB) | | | | | | | |

AUTONOMIC RECLAMATION PROCESSING ON SEQUENTIAL STORAGE MEDIA

CLAIM TO FOREIGN PRIORITY

This application claims priority to European Patent Application No. 09165001.0, filed Jul. 9, 2009, and entitled "Systems and Methods for Automatic Reclamation Processing on Sequential Storage Media."

BACKGROUND OF THE INVENTION

1. Field of the Invention

The present invention relates to the field of management of sequential media, and more particularly, to reclamation processing of sequential media such as tapes, in which management is performed by a storage management application.

2. Description of the Related Art

Storage management applications perform different data storage operations such as backup, archiving and hierarchical storage management. Storage management applications use sequential media such as tape for cost efficient storage mainly for data which is access less often and which is retained for longer periods of time.

A typical example for sequential media is a tape cartridge, also called tape. A tape cannot be written in a random fashion but rather sequentially from the beginning to the end. Thus it is not possible to write data to any position on tape but only at the position where the last write operation ended. When data on a tape needs to be overwritten then the tape must be written from the beginning. Thus tapes are written sequentially. Over time data that has been written to tape expires, which causes data to become inactive. Typically not all data on tape expires at one time, and remaining data stays active.

SUMMARY OF THE DESCRIBED EMBODIMENTS

The process of moving active, non-expiring data to another medium is referred to as reclamation. Storage management applications may be utilized to implement reclamation processes. The reclamation process monitors an amount of active data on each storage media that has been fully written.

Current reclamation processes are typically executed by storage management applications, which consume additional computing resources on the storage management server. In addition, the reclamation process generally requires two devices (such as tape drives). A first device reads the data, and a second device writes the data to the additional medium. In this way, hardware needs may become significant, particularly if several reclamation processes are concurrently executed.

In view of the foregoing, a need exists for a mechanism whereby reclamation processes may be performed while minimizing the use of storage resources (hardware, firmware, software, bandwidth, and other resources). Accordingly, various embodiments for autonomic reclamation of data stored on at least one sequential storage media are provided. In one embodiment, by way of example only, active data stored on the at least one sequential storage media is identified. The active data is read out from a reclamation memory. The active data is stored in a sequential order by starting at a beginning block address of the at least one sequential storage media.

In addition to the foregoing, additional system and computer program product embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 3a shows a tape drive according to the prior art;

FIG. 3b shows an embodiment of a novel tape drive according to the present invention;

FIG. 5 illustrates the SCSI Mode Select 15h command;

FIG. 7 illustrates the SCSI Mode sense Command 1Ah; and

DETAILED DESCRIPTION OF THE DRAWINGS

Figure 1:
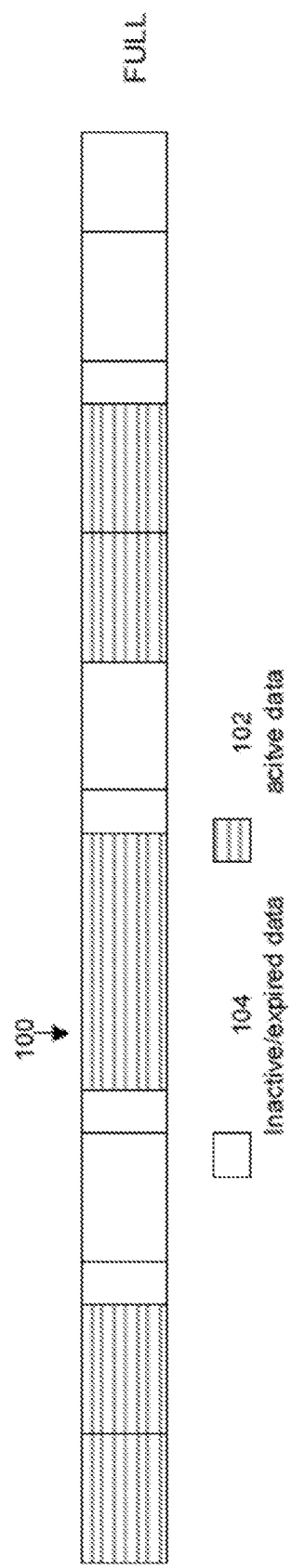
FIG. 1 is a schematic depiction of data locations on a tape.

FIG. 1 is a schematic depiction of data locations on a tape and shows an example for active data 102 and inactive data 104 on a tape 100. As more data becomes inactive over time on a tape as more storage capacity is wasted on tape because the spots with inactive data 104 cannot be overwritten selectively. For example, some tape cartridges have a storage capacity of 1 TB uncompressed. If such tape has 50% active data then 500 GB of storage capacity is wasted. A tape can only be reused when all active data has expired or when all remaining active data has been moved to another medium.

As was previously described, moving the active data 102 to another medium is also called reclamation. Storage management applications may implement the reclamation process. The reclamation process monitors the amount of active data on each tape that has been written full. A user may set a threshold—also called the reclamation threshold—and if the amount of active data falls below that threshold the storage management software automatically copies the remaining active data from that tape to another tape.

Figure 2A:
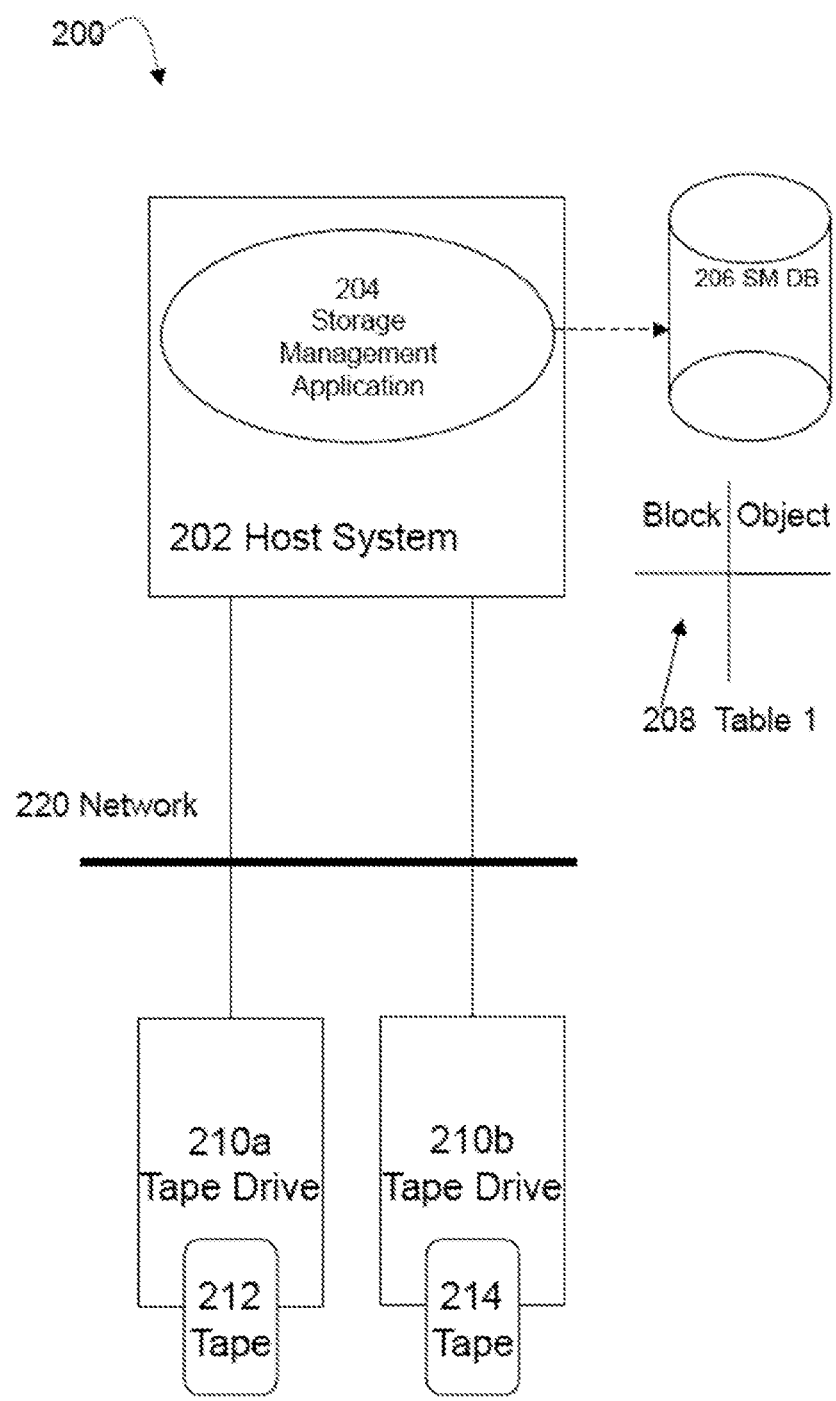
FIG. 2a shows a storage management system according to the prior art.

FIG. 2a shows a storage management system 200 according to the prior art. Storage management application 204 runs on a host computer system 202 that is connected via network 220 to tape drives 210a and 210b. Network 220 might be a Storage Area Network (SAN) based on fibre channel or it might be a Local Area network based on Ethernet. Storage management application 204 reads and writes data to tape drives via network 220 and utilizes a storage management application database 206 to store table 1 referenced by reference sign 208, which maps the data object name to the block addresses on tape.

In an exemplary storage management application, a tape enters the following states during its lifecycle:

EMPTY, meaning no active data on the tape; this status is active when a tape is new and has not been used before, or after reclamation when remaining active data has been moved to another tape.

FILLING, meaning a tape is now in a state were it is sequentially filled up with new data until the end of the tape is reached. When a filling tape has no free space left it is marked FULL.

FULL, this state stays active even data on the tape expires over time. In some implementations, after a reclamation of such a FULL tape, the state FULL changes to EMPTY. Then the tape lifecycle starts again, from status EMPTY to FILLING, to FULL, back to EMPTY, to FILLING to FULL, etc.

The storage management application 204 also implements the reclamation process, which monitors the amount of active data on tape such as tape 212 and 214. If the total amount of active data on tape 212 drops below the reclamation threshold the storage management application will mount tape 212 in tape drive 210a and it will mount an empty or filling tape 214 in tape drive 210b. The storage management application 204 will subsequently read all data objects which are active—utilizing table 1 (208) to map the data object to block addresses on tape 212—and write the active data objects to tape 214 in tape drive 210b. Thereby the storage management application updates table 1 with the new block addresses of the data on tape 214. Once all active data objects on tape 212 have been read and written to tape 214 the tape 212 can be reused from scratch.

FIG. 3a shows a tape drive 210 (210a or 210b) according to the prior art. Tape drive 210 has an I/O interface 302 which is connected to network 220 (FIG. 2). Tape drive 210 obtains commands such as SCSI command sent via fibre channel (SAN) or iSCSI (LAN) from the storage management application 204 (FIG. 2). Tape drive 210 further includes a cache memory 304 which is used to buffer data written by the storage management application via interface 302. In some embodiments, a 1 GB cache memory is used. Tape controller 306 manages all tape operations and the protocol on interface 302. The read/write assembly performs read and write operations on tape cartridge 212 that must be loaded in tape drive 210. For example when the storage management application 204 (FIG. 2) sends a write command to the tape drive 210 via network 220 (FIG. 2) the tape controller 306 instructs the storage management application to send the data to be written with the write command and buffers the data in cache memory 304.

When all data has been sent by the application or cache memory 304 is filled up, the tape controller instructs the read/write assembly 308 to write the data to tape cartridge 212. Likewise, when the storage management application sends a read command including a block address from where the data is to be read, the controller 306 receives this read command and instructs the read/write assembly 308 to position the tape at the requested block addresses. Subsequently it instructs the read/write assembly to read the requested data and transfers the data via the I/O interface 302 to the storage management application. Depending on the amount of data to be read some data might be buffered in cache memory 304.

The reclamation process according to the prior art has a couple of disadvantages. First, the reclamation process is executed by the storage management application 204 which consumes additional computing resources on the storage management server. Second, the reclamation process requires a number of two devices (tape drives 210): one to read the data from and one to write the data to. So, the hardware needs are significant. Further, during reclamation the network between the storage management server and the tape device is utilized which consumes network capacity.

Even further, data sets or files which might belong together due to closely related content might be written to two distinct tapes during reclamation in case one output tape gets full. This causes longer restore times and utilizes more physical drive resources because two tapes must be mounted in two respective drives for recall of data. Finally, in order to keep the impact of the above two reasons low the prior art recommendation is typically to start the reclamation process when 30% or less percent active data resides on a sequential medium. This however causes a waste of storage capacity because 70% of the tape capacity are not used for active data.

The objective of the present invention is thus to provide an improved reclamation method and system. This objective of the invention is achieved by the features stated in enclosed independent claims. Further advantageous arrangements and embodiments of the invention are set forth in the respective subclaims. According to its broadest aspect the inventional method for performing a tape drive data reclamation procedure is disclosed where the tape drive includes a reclamation memory and a reclamation logic which identifies active data block addresses and reads out active data from the tape to the reclamation memory and writes active data in sequential order starting at the beginning of the tape, characterised by the steps of:

a) identifying active data block addresses,
b) reading out the active data from the tape in a sequential order which is characterized by sequential block addresses,
c) writing said active data to a reclamation memory—e.g. a random access device such as SSD, flash memory, EEPROM, disk, etc., having a sufficiently large storage capacity to buffer said active data,
d) after completion of step c) writing said buffered active data back in a sequential order to the same tape starting from the beginning to tape.

When further this method comprises the step of automatically performing said reclamation procedure in occurrence of active data portion falling beneath a predefined reclamation threshold level, then the advantages are further enhanced, as this method can be operated fully automatically and without any major human interaction, which makes the sequential memory device behave in terms of defragmentation purposes nearly like a random access memory device.

Further advantageously, this method comprises the following steps performed by the storage management application:
a) the application determines original block addresses of active data and generates a list of such address
b) the application sends this list to the tape drive controller;

Upon reception of this list tape drive controller performs steps of:
c) the controller reads active data from the original block addresses given in the list and buffers this data in a internal memory
d) the controller writes active data to new block addresses sequentially from the beginning of tape.

Further, advantageously this method comprises the following steps performed by the storage management application:
a) said application determines original block addresses of active data,
b) said application determines for each original block address of active data a new block address for active data being written thereto, thus yielding a mapping between active data original address and future address, and
c) said application sends this mapping list to the tape drive controller.

Upon reception of this list the tape drive controller performs the following steps of:

d) the controller reads each block of active data from the original block address into a memory, e) the controller writes said block of data to the new block address and performs reclamation autonomously from the storage management application.

So, in other words, the present invention teaches a novel tape drive system comprising an internal reclamation memory that might be based on solid state disk and methods to utilize this memory for reclamation processing. The present invention further extends the protocol between the storage management application and the inventional tape drive system enabling the storage management application to send a list of blocks where active data is stored on a given tape cartridge.

In one embodiment, the present invention teaches an inventional tape drive characterized by an reclamation memory and a reclamation logic and methods where the storage management application identifies a tape to be reclaimed and mounts this tape into the inventional tape drive; the storage management application determines a list of original block addresses and sends a command to the inventional tape drives instructing it to start reclamation processing based on the list of original block addresses denoting active data; upon reception of this command the tape drives reclamation logic reads the active data denoted by the original block addresses off the tape in a sequential order, buffers it in the reclamation memory and finally writes it sequentially from the beginning of tape—thereby providing a mapping between original and new block addresses—until is has finished processing all blocks given by the storage management application; upon completion the tape drives sends a notification to the storage management application and upon reception of this notification the storage management application reads the mapping of original and new block addresses for the active data and updates its internal tables.

In an alternate embodiment the storage management application creates a mapping of original and new block addresses for all active data store on a tape and sends this mapping table to the tape drive; tape drive reads all data from the original block addresses; buffers the data in the reclamation memory and write it to the new block addresses. The original block addresses denote active data and the new block addresses arrange active data at the beginning of tape. Once processing is complete the tape drive sends a notification to the storage management application and the storage management application updates its internal tables.

When the processing of the embodiments above has completed then all active data is sequentially written at the beginning of tape and the storage management server can reuse that tape and write new data beyond the active data such as a "filling" tape, i.e. a tape having the status of "FILLING" as mentioned further above. Thus the inventive system and method enables the tape drive to perform reclamation processing by arranging all active data at the beginning of the tape and providing the storage management server with a new list of block addresses. This overcomes the disadvantages mentioned above because the reclamation process is not executed by the storage management server but by the tape drive itself.

Within the inventive system and methods the lifecycle of a tape is different to prior art. The tape states EMPTY, FILLING, FULL described above do repeat in such an inventive system EMPTY, FILLING, FULL, FILLING, FULL, FILLING, Full, etc. As a result, basically a tape has the EMPTY state only once in its very beginning of its lifecycle, when being used the first time. During the further tape lifecycle the tape states alternate between FULL and FILLING. Further, only one tape drive is required. Further, the network between the storage management server and the tape drive is not utilized for reclamation processing. Still further, all data sets or files will remain on the same tape as they have been before which optimizes the restore performance and saves physical tape drive resources, and finally, the reclamation processing can be performed at any time because it minimizes the impact to the storage management server.

With general reference to the figures and with special reference now to FIG. 3b, the tape drive 210 according to prior art (FIG. 3a) is extended by a reclamation memory 310 and by a reclamation logic 312 implementing the inventional method at least in major parts. The reclamation memory 310 is used to buffer the active data that is being reclaimed. In an alternate embodiment of this invention, the reclamation memory 310 and cache memory 304 can be the same memory which advantageously reduces the extent of changes to prior art tape drives. The reclamation logic is embedded in the tape drive controller 306 and may, in one embodiment, represented by software or firmware. The inventional reclamation logic 312 is used to control the reclamation process 400 (explained later) and to maintain the mapping table 2.

Figure 2B:
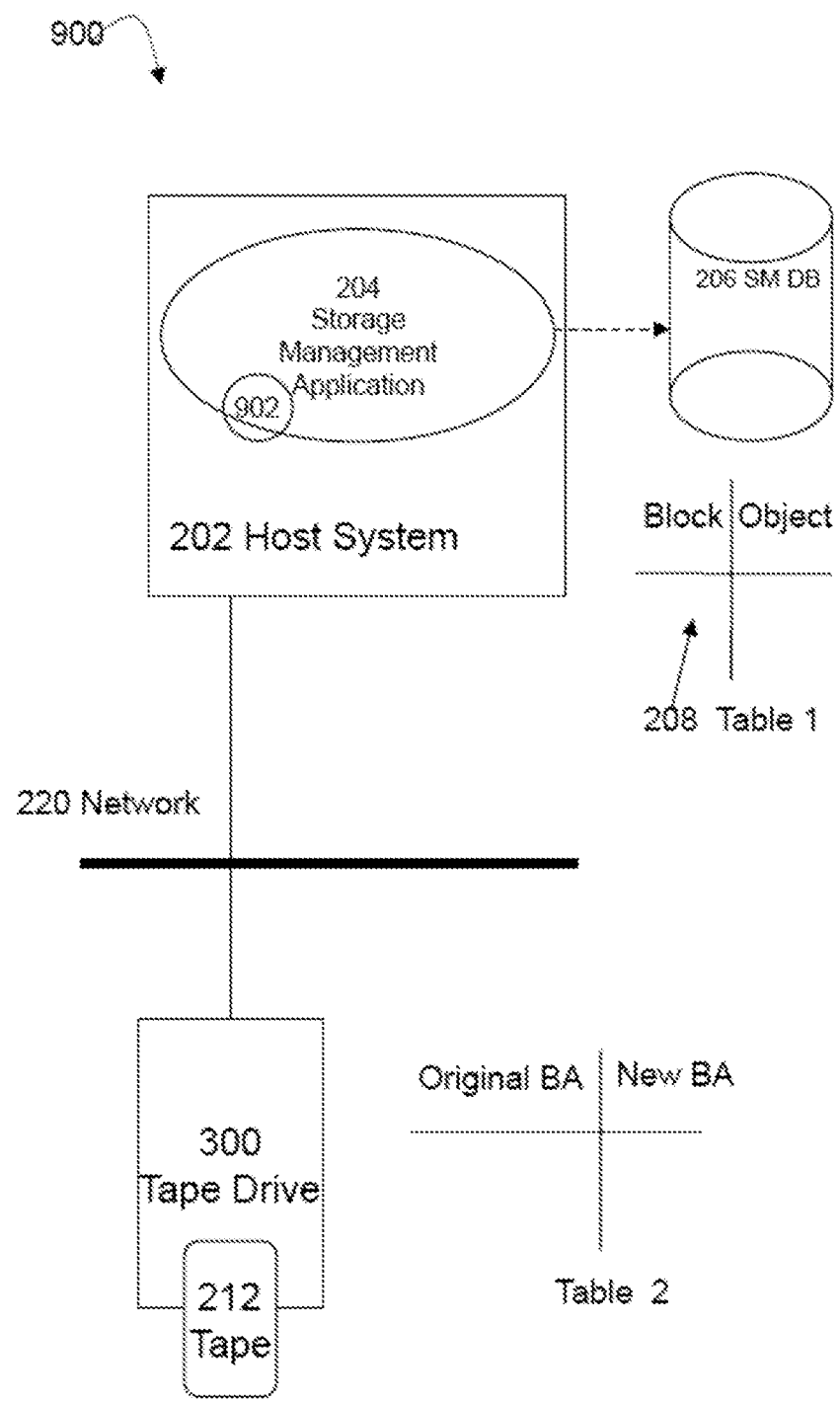
FIG. 2b illustrates a novel storage management system that extends the storage management system by the inventional tape drive and the inventional block address component installed in the storage management application.

FIG. 2b shows the inventive storage management system 900 which extends the storage management system 200 (FIG. 2a) by the inventional tape drive 300 (FIG. 3b) and the inventional block address component 902 installed in the storage management application 204.

Figure 4:
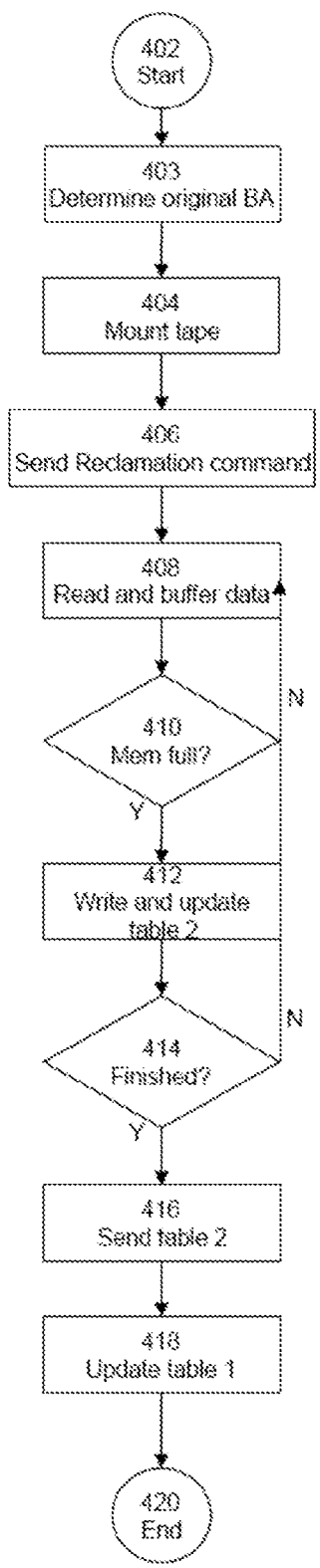
FIG. 4 illustrates the control flow of the inventional reclamation process according to a preferred embodiment thereof.

The block address (BA) component 902 which is part of the storage management application 204 and the inventional tape drive 300 execute the inventional reclamation process 400, see FIG. 4 for details. This novel reclamation process 400 will essentially provide the tape drive 300 with a list of block addresses (denoted as BA in the drawings) and representing active data for a tape 212. The tape drive 300 reads all data denoted by block addresses for active data, buffers the data in the reclamation memory 310 and writes the read data to the beginning of tape. Thus at the end of the process all active data on the tape is consolidated at the beginning of the tape while the end of the tape can be reused for new data.

In order to maintain the addresses of the active data the reclamation logic 312 provides a mapping table 2. The mapping table 2 below essentially maps the original block addresses (prior to the process) to the new block addresses (after the process ends).

TABLE 2 mapping block addresses

| Original Block address | New Block Address |
|---|---|
| 25 | 1 |
| 30-100 | 2-72 |

As shown in the second row of the table above the data stored in original block address 25 prior to the process is stored in new block address 1 after the process finished. Likewise and as shown in the third row the data which was stored in original block addresses 30-100 prior to the process stored in new block addresses 2-72 after the process. Table 2 is provided to the storage management application 204 (FIG. 2) at the end of process 400.

FIG. 4 outlines an additional embodiment of the inventional reclamation process 400 which is started by the storage management application 204 (FIG. 2) and which is executed by the reclamation logic 312 in conjunction with the reclamation memory 310 of novel tape drive 300.

Process 400 starts in step 402 where a tape 212 is selected for reclamation processing, perhaps based on the reclamation threshold. In step 403 the block address component 902 of the storage management application 204 (see FIG. 2b) identifies the original block addresses of active data on the selected tape via table 1 (208 in FIG. 2b) and generates a list of original block addresses. In step 404 the storage management application 204 mounts the tape to novel tape drive 300. In step 406 the storage management application sends a reclamation command to tape drive controller 306 via network 220 and I/O interface 302 which contains the list of original block addresses generated in step 403. The block address component 902 installed at the storage management application actually performs step 404 and 406. The reclamation command can for example be a modified SCSI MODE SELECT command (15h) 500 (see FIG. 5). This SCSI MODE SELECT command (15h) 500 allows the storage management application 204 to instruct the tape drive 300 to perform reclamation with the mounted tape and also allow the storage management application to send a list of original block addresses of active data.

After receiving the reclamation command the tape controller 306 activates the inventional reclamation logic 312 (step 406). In step 408 the reclamation logic examines the list of block addresses for active data objects and starts to read the data from the tape at the original block addresses given and stores this data in the reclamation memory 310. In step 410 the reclamation logic checks if memory 310 is full. If the answer in step 410 is no the process continues with step 408 explained before. If the answer in step 410 is yes the process continues to step 412.

In step 412 the reclamation logic writes the content of the memory 310 to the beginning of the tape or to the position where it has stopped writing before during this reclamation process 400. During the write operation the blocks of active date are written to new block addresses on tape, these new block addresses and the original block addresses are memorized. The reclamation logic updates table 2, which maps the new block addresses where the data is written in step 412 to the original block addresses where the data was read from in step 408. When all data from memory has been written to tape the process continues with step 414.

In step 414 the process checks if all block addresses given by the storage management application in step 406 have been process. If the answer is no the process returns to step 408 explained before. If the answer is yes and all active data has been consolidated at the beginning of tape the process continues to step 416.

Figure 8:
FIG. 8 illustrates the Mode page 26h including the inventional mapping of original and new block addresses.

In step 416 the tape drive 300 send table 2 to the storage management application. Thereby the tape drive notifies the storage management application that the reclamation processing completed. This notification might be based on the SCSI Asynchronous Event Notification (AEN) or it may be based on standard SCSI check conditions indicating with a new return code indicating that reclamation processing has completed. Table 2 can be sent as a response of a SCSI MODE SENSE command (1Ah) 700 in FIG. 7 via mode page (26h) 800 (FIG. 8). Alternatively table 2 can be sent via an out-of-band connection. For example the IBM TS1130 tape drive includes an Ethernet port over which table 2 can be sent to the storage management application based on SNMP.

In step 418 the storage management application and more particular the block address component 902 (FIG. 9) applies table 2 to its table 1 by replacing the original block addresses of the active data objects with the new block addresses given in table 2. In step 420 the process ends.

In an alternate embodiment the storage management application 204 and more particular the block address components 902 (FIG. 2b) maps the original block addresses of active data to new block addresses in step 403 and generates a list mapping original addresses to new addresses. This list is essentially according to the structure of table 2 which maps the original block addresses of the data on tape to the new block addresses. Subsequently the block address component 902 (FIG. 2c) mounts the tape in step 404 and sends this list (table 2) to the tape drive 300 using mode select command 500 and mode page 800. The tape drive 300 subsequently reads all data denoted by the original block addresses (table 2) and writes this data to the new block addresses denoted in table 2 (steps 408-414 in FIG. 4). Subsequently it sends a notification to the storage management application and the block address component 902 which updates table 1 with the new block addresses.

FIG. 5 illustrates the SCSI Mode Select command (15h) 500. The mode select command (15h) 500 in FIG. 5 allows the storage management application 204 (FIG. 2) sending a mode page to the tape drive 300. This command has a command code 502 of 15h, where the suffix h denotes hexadecimal or base 16. This command code 502 instructs the tape drive 300 that this is a mode select command 500. The parameter list length 504 specifies the size of the mode page to be transferred in bytes. Subsequently to sending this command the storage management application will send the actual mode page. The layout of an actual mode page 600 is described in FIG. 6. For the purpose of this invention, the mode page 600 includes the instruction to perform reclamation and the list of original block addresses 606, 608 and 610 associated with active data. The mode select command 500 is followed by a mode parameter header, a block descriptor and one or more mode pages such as mode page 600.

Figure 6:
FIG. 6 illustrates the mode page 25h which is sent subsequently to the mode select command.

FIG. 6 shows the mode page 25h (600) which is sent subsequently to the mode select command. The exemplary mode page 600 has the page code 602 of 25h, where the suffix h denotes hexadecimal or base 16, and a page length 604 which indicates the length of the mode page 600 in bytes. In this example each block address is encoded in two bytes, so with N block addresses (N represents a integer number) require a length of 2*N bytes. Parameter 606 includes the first block address of an active data block 102 (FIG. 1). Parameter 608 includes the second block address of an active data block and parameter 610 includes the last (Nth) block address of an active data block.

In an alternate embodiment of this invention the mode page 25h includes the original block address and the new block address for active data which the storage management application determined. This alternate mode page 25h is identical to the mode page 26h of FIG. 8. Similar to the mode select command 500 (FIG. 5) which allows the storage management application 204 to transfer the list of original block addresses for active data to the tape drive 300, the mode sense command 700 (FIG. 7) allows the storage management application to read the mapping of original to new block addresses from the tape drive.

The mode sense command 700 in FIG. 7 allows the storage management application to read a mode page such as mode page 26h (FIG. 8) from the tape drive 300. The mode sense command 700 command code therefore is denoted as 702 of 1Ah, where the suffix h denotes hexadecimal or base 16. The command code 702 instructs the tape drive 300 that this is a mode sense command. The page code field 704 specifies the mode page 26h to be read (mode page 800 in FIG. 8). The allocation length field 704 specifies the size of the mode page to be transferred in bytes. Upon reception of the mode select command the tape drive 300 generates the list mapping the original block addresses to the new block addresses for active data. Subsequently to sending command 700 the tape drive will return the actual mode page 26h. The layout of an actual mode page 26h is described in FIG. 8.

For the purpose of this invention, the mode page 26h (FIG. 8) includes a mapping of original block addresses to new block address as shown in table 2. The exemplary mode page 800 has the page code 802 of 26h, where the suffix h denotes hexadecimal or base 16, and a page length 804 which indicates the length of the mode page 800 in bytes. In this example each block address is encoded in 2 bytes and one set of block addresses comprises the original and new block address so N sets of block addresses (N represents a integer number) require a length of 4*N bytes. Parameter 806 includes the first original block address and parameter 808 includes the first new block address. Original and new block addresses are derived from tape drive 300 from table 2. Likewise, parameter 810 includes the N-th original block address and parameter 812 includes the N-th new block address.

Figure 3C:
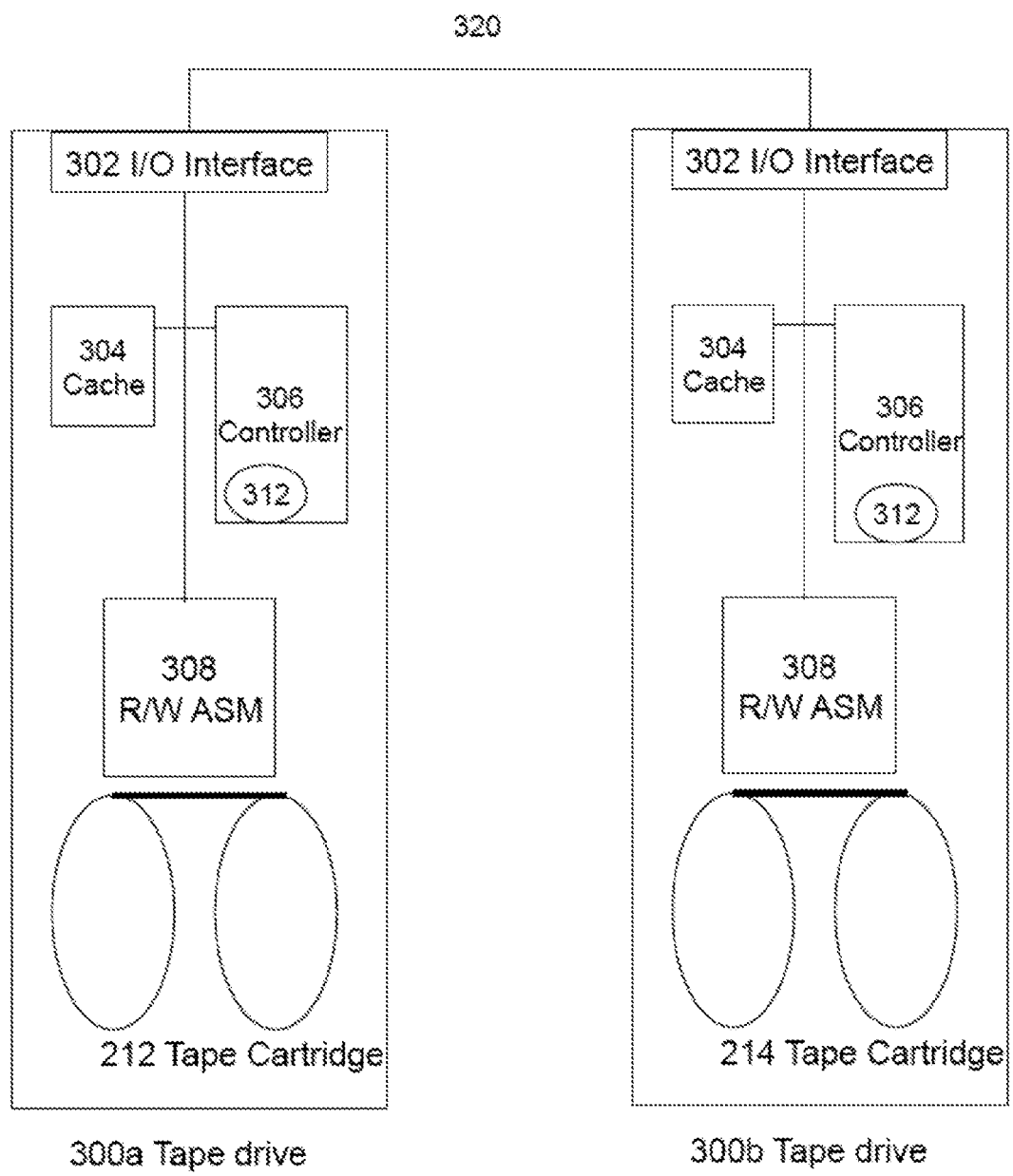
FIG. 3c shows an alternate embodiment of the invention with the reclamation memory being a tape.

Various modifications of the predescribed embodiments are possible. In yet an alternate embodiment the reclamation memory is provided by a second tape drive as shown in FIG. 3c. Tape drives 300a and 300b are coupled via link 320 over the I/O interfaces 302. Tape drive 300a performs the inventional reclamation process 400 (FIG. 4) for tape 212 and buffers the data on tape 214 which is loaded in drive 300b in step 408 of FIG. 4. Thus tape 214 which is loaded in tape drive 300b represents the reclamation memory. Thus no additional reclamation memory is required.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for autonomic reclamation of data stored on at least one sequential storage media by a processor device in communication with a reclamation memory, the method comprising:
    identifying active data stored on the at least one sequential storage media;
    reading out the active data from the reclamation memory;
    storing the active data in a sequential order by starting at a beginning block address of the at least one sequential storage media;
    defining at least one of a start address, an end address, and a data length of all original blocks of the active data in a backup application;
    generating, for each original block of active data, a new start address to be written to the backup application;
    yielding a mapping between an active data actual address and a future address;
    sending the mapping from the backup application to a sequential storage media device having the at least one sequential storage media;
    reading, in the sequential storage media device, from each original block address, the active data in a sequential order; and
    storing the read active data in the reclamation memory, and writing in the sequential order, in the sequential storage media device, each of the original blocks of active data to the new start address to arrange all of the active data at the beginning of the sequential storage media device with no intervening inactive data blocks.

2. The method of claim 1, further including performing at least one of the identifying, the reading, and the storing in response to an active data portion falling beneath a predefined reclamation threshold level.

3. The method of claim 1, further including determining a completion of a reclamation process, and sending a notification to a backup application via an asynchronous event notification.

4. The method of claim 1, further including determining a completion of a reclamation process, and sending a notification to a backup application via a simple network management protocol (SNMP) trap.

5. The method of claim 1, further including:
    receiving a notification from a sequential storage media device having the sequential storage media,
    sending a command to the sequential storage media device instructing the sequential storage media device to return a mapping of original blocks to new blocks, and
    updating a table by replacing the original blocks with the new blocks received from the sequential storage media device.

6. The method of claim 1, further comprising employing the same sequential storage media for each step of the method.

7. A system for autonomic reclamation of data stored on a sequential storage media comprising:
    a reclamation memory; and
    a sequential storage media device on which the reclamation memory is operable, the sequential storage media device having at least one sequential storage media for executing read and write operations;
    wherein the sequential storage media device is configured for performing a reclamation process including:
        identifying active data stored on the at least one sequential storage media,
        reading out the active data from the reclamation memory,
        storing the active data in a sequential order by starting at a beginning block address of the at least one sequential storage media,
        defining at least one of a start address, an end address, and a data length of all original blocks of active data in a backup application,
        generating, for each original block of active data, a new start address to be written to the backup application,
        yielding a mapping between an active data actual address and a future address,
        sending the mapping from the backup application to a tape drive,
        reading, in the tape drive, from each original block address, the active data in a sequential order, and
        storing the read active data in the reclamation memory, and writing in the sequential order, in the tape drive, each of the original blocks of active data to the new start address to arrange all of the active data at the beginning of the tape drive with no intervening inactive data blocks.

8. The system of claim 7, where the reclamation memory is a tape drive internal memory device.

9. The system of claim 7, wherein the reclamation memory is a tape loaded in a tape drive, the tape drive connected to the sequential storage media device performing the reclamation process.

10. The system of claim 7, wherein the sequential storage media device is further configured for automatically performing at least one step of the reclamation process in response to an active data portion falling beneath a predefined reclamation threshold level.

11. The system of claim 7, wherein the sequential storage media device is further configured for determining a completion of the reclamation process, and sending a notification to a backup application via an asynchronous event notification.

12. The system of claim 7, wherein the sequential storage media device is further configured for determining a completion of the reclamation process, and sending a notification to a backup application via a simple network management protocol (SNMP) trap.

13. The system of claim 7, further including a backup application in communication with the sequential storage media device, wherein the backup application is configured for:
    receiving a notification from the sequential storage media device,
    sending a command to the sequential storage media device instructing the sequential storage media device to return a mapping of original blocks to new blocks, and
    updating a table by replacing the original blocks with the new blocks received from the sequential storage media device.

14. A computer program product for autonomic reclamation of data stored on at least one sequential storage media by a processor device in communication with a reclamation memory, the computer program product comprising a non-transitory computer-readable storage medium having computer-readable program code portions stored therein, the computer-readable program code portions comprising:

a first executable portion for identifying active data stored on the at least one sequential storage media;

a second executable portion for reading out the active data from the reclamation memory;

a third executable portion for storing the active data in a sequential order by starting at a beginning block address of the at least one sequential storage media; and a fourth executable portion for:
   defining at least one of a start address, an end address, and a data length of all original blocks of the active data in a backup application,
   generating, for each original block of active data, a new start address to be written to the backup application,
   yielding a mapping between an active data actual address and a future address,
   sending the mapping from the backup application to a sequential storage media device having the at least one sequential storage media,
   reading, in the sequential storage media device, from each original block address, the active data in a sequential order, and
   storing the read active data in the reclamation memory, and writing in the sequential order, in the sequential storage media device, each of the original blocks of active data to the new start address to arrange all of the active data at the beginning of the sequential storage media device with no intervening inactive data blocks.

15. The computer program product of claim 14, further including a fifth executable portion for performing at least one of the identifying, the reading, and the storing in response to an active data portion falling beneath a predefined reclamation threshold level.

16. The computer program product of claim 14, further including a fifth executable portion for determining a completion of a reclamation process, and sending a notification to a backup application via an asynchronous event notification.

17. The computer program product of claim 14, further including a fifth executable portion for determining a completion of a reclamation process, and sending a notification to a backup application via a simple network management protocol (SNMP) trap.

18. The computer program product of claim 14, further including a fifth executable portion for:
   receiving a notification from a sequential storage media device having the sequential storage media,
   sending a command to the sequential storage media device instructing the sequential storage media device to return a mapping of original blocks to new blocks, and
   updating a table by replacing the original blocks with the new blocks received from the sequential storage media device.

* * * * *